United States Patent

Schedel et al.

[11] Patent Number: 4,523,436
[45] Date of Patent: Jun. 18, 1985

[54] INCREMENTALLY ADJUSTABLE ELECTRONIC EXPANSION VALVE

[75] Inventors: John W. Schedel, Lafayette; Richard G. Lord, Liverpool, both of N.Y.

[73] Assignee: Carrier Corporation, Syracuse, N.Y.

[21] Appl. No.: 564,543

[22] Filed: Dec. 22, 1983

[51] Int. Cl.³ .............. F25B 41/04; F16K 31/02
[52] U.S. Cl. .................. 62/222; 251/133; 251/282; 251/DIG. 1
[58] Field of Search ........ 62/222, 528; 251/133, 251/324, 282, DIG. 1, 330, 318, 319, 325; 236/75, 76, 78 C, 78 D, 1 EB; 137/625.38, 625.37, 625.33

[56] References Cited

U.S. PATENT DOCUMENTS

| 1,928,071 | 9/1933 | Mueller | 251/282 X |
|---|---|---|---|
| 2,323,354 | 7/1943 | Rees | 62/8 |
| 2,327,366 | 8/1943 | Nampa | 91/393 X |
| 2,491,905 | 12/1949 | Ray | 62/127 |
| 2,931,673 | 4/1960 | Gondek | 251/DIG. 1 |
| 3,070,974 | 1/1963 | Greenwald | 62/197 |
| 3,250,084 | 5/1966 | Anderson | 62/212 |
| 3,537,272 | 11/1970 | Hales et al. | 62/157 |
| 3,577,743 | 5/1971 | Long | 62/212 |
| 3,590,592 | 7/1971 | High | 62/115 |
| 3,914,952 | 10/1975 | Barbier | 62/197 |
| 3,967,781 | 7/1976 | Kunz | 236/68 R |
| 3,987,642 | 10/1976 | Portoso et al. | 62/211 |
| 4,028,593 | 6/1977 | Newell | 361/27 |
| 4,067,203 | 1/1978 | Behr | 62/208 |
| 4,193,269 | 3/1980 | Barry | 62/171 |
| 4,362,027 | 12/1982 | Barbier | 62/197 |
| 4,410,428 | 10/1983 | Cooper | 137/601 |
| 4,420,947 | 12/1983 | Yoshino | 62/160 |

FOREIGN PATENT DOCUMENTS

| 808515 | 7/1951 | Fed. Rep. of Germany | 251/282 |
|---|---|---|---|
| 1186275 | 8/1959 | France | 251/282 |
| 561331 | 4/1957 | Italy | 251/282 |

Primary Examiner—Harry Tanner
Attorney, Agent, or Firm—Robert H. Kelly

[57] ABSTRACT

An incrementally adjustable electronic expansion valve for precisely controlling refrigerant flow through the valve is disclosed. Basically, the expansion valve includes a stepper motor, a sleeve member, and an orifice assembly. The sleeve member is incrementally moved over a slot(s) in the orifice assembly by operation of the stepper motor to control refrigerant flow between an inlet and an outlet of an expansion valve. A control system provides electronic digital control signals to the stepper motor to control operation of the motor in response to superheat of refrigerant flowing from an evaporator to a compressor of the refrigeration system. The electronic expansion valve may also include sealing means to substantially prevent refrigerant flow through the valve when the sleeve member is in its fully closed position.

6 Claims, 4 Drawing Figures

INCREMENTALLY ADJUSTABLE ELECTRONIC EXPANSION VALVE

BACKGROUND OF THE INVENTION

The present invention relates to refrigeration systems and more particularly relates to expansion valves for use in refrigeration systems. The present invention is described herein in detail with respect to a conventional refrigeration system. However, those of ordinary skill in the art to which the present invention pertains will readily recognize the broader applicability of the present invention. For example, the present invention may find application in a heat pump system, an air conditioning system, or other such system.

Conventional refrigeration systems utilize a recirculating refrigerant for removing heat from the low temperature side of the refrigeration system and for discharging heat at the high temperature side of the refrigeration system. The work input necessary to operate the refrigeration system is provided by a motor driven compressor which receives low pressure gaseous refrigerant and compresses it to a high pressure. This high pressure gaseous refrigerant is supplied to a condenser where heat is removed from the gaseous refrigerant to condense it to a liquid. This liquid refrigerant is then supplied through an expansion valve to an evaporator wherein heat is transferred from a heat transfer fluid used to cool a load, such as to cool a room, to the liquid refrigerant to evaporate the liquid refrigerant. This gaseous refrigerant from the evaporator is then returned to the compressor for recirculation through the refrigeration system.

The amount of heat absorbed by the refrigerant liquid in the evaporator includes the heat of vaporization of the liquid refrigerant; that is, the amount of heat which must be absorbed by a liquid at a given temperature to convert it to a gas at the same temperature. In addition, the gaseous refrigerant in the evaporator may absorb additional heat which raises its temperature above the temperature of vaporization. Such gaseous refrigerant is said to be superheated, and the amount by which the temperature of the gaseous refrigerant is raised above the vaporization temperature is expressed in degrees of superheat. Ideally, the expansion valve should admit an amount of refrigerant that can be evaporated and just slightly superheated in the evaporator. That is, the evaporator should be "wetted" with refrigerant along approximately its entire length to provide good heat transfer and maximum refrigeration system efficiency. Conventionally, a portion of the evaporator always has been operated dry to prevent passage of liquid refrigerant to the suction side of the compressor since liquid entering the suction side of the compressor may damage the compressor.

The expansion valve and its control system play important parts in overall refrigeration system operation and in overall refrigeration system efficiency. It is highly desirable to provide a refrigeration system with an expansion valve which can precisely control refrigerant flow through the valve, which can provide other functions such as a shutoff function, and whose operating position can be simply, reliably, and accurately determined during operation of the valve. For example, superheat and refrigeration system evaporator wetting characteristics may be optimized to optimize refrigeration system operating efficiency with an expansion valve which can precisely control refrigerant flow from the condenser to the evaporator of the refrigeration system. Also, if the expansion valve can provide a shutoff valve function in addition to controlling refrigerant flow this eliminates the need for using a liquid line solenoid valve as part of the refrigeration system. Further, if operating position of the expansion valve is always known then a control system for the refrigeration system may be programmed to more effectively and efficiently operate the refrigeration system by carrying out certain control actions based on expansion valve position.

However, known refrigerant expansion valves are not particularly well suited to provide the functions described above. For example, thermostatic expansion valves, which are probably the most prevalent type of expansion valve used in refrigeration systems, are not particularly suitable for precisely controlling refrigerant flow through the valve to optimize refrigeration system operating efficiency by precisely controlling superheat and evaporator wetting characteristics. When thermostatic expansion valves are used to control superheat and evaporator wetting characteristics they generally suffer, among other shortcomings, a slow response time, a wide regulating range, and a narrow load range. In addition, thermostatic expansion valves are not well suited to provide other functions such as a shutoff valve function. Further, it is difficult to accurately determine the operating position of thermostatic expansion valves during operation of the valves.

Electrically controlled expansion valves with analog control systems also are known. The analog control system opens and closes the valve in response to refrigeration system operating conditions sensed by sensors providing input signals to the analog control system which are a function of the sensed refrigeration system operating conditions. Examples of such electrically controlled expansion valves with analog control systems are disclosed in U.S. Pat. Nos. 4,362,027 to Barbier, 4,067,203 to Behr, 3,967,781 to Kunz, and 3,577,743 to Long. In general, such electrically controlled expansion valves should be able to control refrigeration systems more precisely than thermostatic expansion valves because of the theoretically faster response time of the electrically controlled expansion valves. However, while such electrically controlled expansion valves may be an improvement over thermostatic controlled expansion valves, these electrically controlled expansion valves are not ideal in operation. In general, they are not particularly suitable for maintaining desired levels of refrigerant superheat and/or evaporator wetting characteristics to optrmize refrigeration system efficiency without undesirable hunting of the expansion valve or flooding of the refrigeration system compressor. Also, some of these electrically controlled expansion valves are not capable of providing other functions such as a shutoff valve function. Further, it is not particularly easy to reliably and accurately determine the operating position of such electrically controlled expansion valves during their operation.

SUMMARY OF THE INVENTION

Therefore, an object of the present invention is to provide a refrigerant expansion valve which can precisely control refrigerant flow through the valve.

Another object of the present invention is to provide a refrigerant expansion valve which can perform other functions besides its refrigerant control function, such as performing a shutoff valve function.

A further object of the present invention is to provide a refrigerant expansion valve whose operating position can be simply, reliably, and accurately determined during operation of the valve.

These and other objects of the present invention are attained by an electronic expansion valve comprising an inlet, an outlet, an orifice assembly, a sleeve member, and a stepper motor. The orifice assembly comprises at least one slot for controlling refrigerant flow from the inlet through the orifice assembly to the outlet of the electronic expansion valve. The sleeve member is operatively connected to the stepper motor and the sleeve member slides over the slot in the orifice assembly to incrementally open up or close off part or all of the slot in response to operation of the motor. A control system supplies electronic digital control signals to the stepper motor to control motor operation in response to certain sensed operating conditions of the refrigeration system. For example, the motor operation may be controlled in response to superheat of the refrigerant flowing from the evaporator to the compressor of the refrigeration system. Preferably, the control system includes a microcomputer.

In a refrigeration system, incremental control of refrigerant flow through an expansion valve according to the present invention provides very precise control of refrigerant flow to the evaporator of the refrigeration system. This allows very precise control of superheat of refrigerant vapor flowing from the evaporator to a compressor of the refrigeration system and allows very precise control of refrigerant wetting characteristics in the evaporator of the refrigeration system. This precise control of superheat and evaporator wetting characteristics, among other things, allows optimization of the operating efficiency of the refrigeration system. Also, incremental control of the expansion valve provides accurate positioning of the expansion valve without the necessity of providing means, such as a feedback sensor, to sense the position of the valve during operation of the valve.

In addition to the features described above, preferably, an incrementally adjustable electronic refrigerant expansion valve according to the present invention includes sealing means for completely shutting off flow through the valve when the sleeve member is in its fully closed position covering all of the slot(s) in the orifice assembly of the valve. Preferably, the sealing means comprises a first seal means located above the slot(s) in the orifice assembly between the sleeve member and a capped end of the orifice assembly and a second seal means located below the slot(s) in the orifice assembly between the sleeve member and the main body of the orifice assembly. These first and second seal means, with the sleeve member, effectively enclose the slot(s) in the orifice assembly when the sleeve member is in its fully closed position. This substantially prevents refrigerant flow between the inlet and outlet of the electronic expansion valve when the sleeve member is in its fully closed position. In addition to the first and second seal means, a spring loaded follower may be provided for compressing and covering over the second seal means to hold it in position when the sleeve member is moved out of contact with the second seal means during operation of the electronic expansion valve. The follower is loaded so that it is displaced partially out of contact with the second seal means by the sleeve member when the sleeve member is moved to its fully closed position in contact with the second seal means.

BRIEF DESCRIPTION OF THE DRAWING

Other objects and advantages of the present invention will be apparent from the following detailed description in conjunction with the accompanying drawing, wherein like reference numerals identify like elements, and in which.

DESCRIPTION OF THE PREFERRED EMBODIMENT

Figure 1:
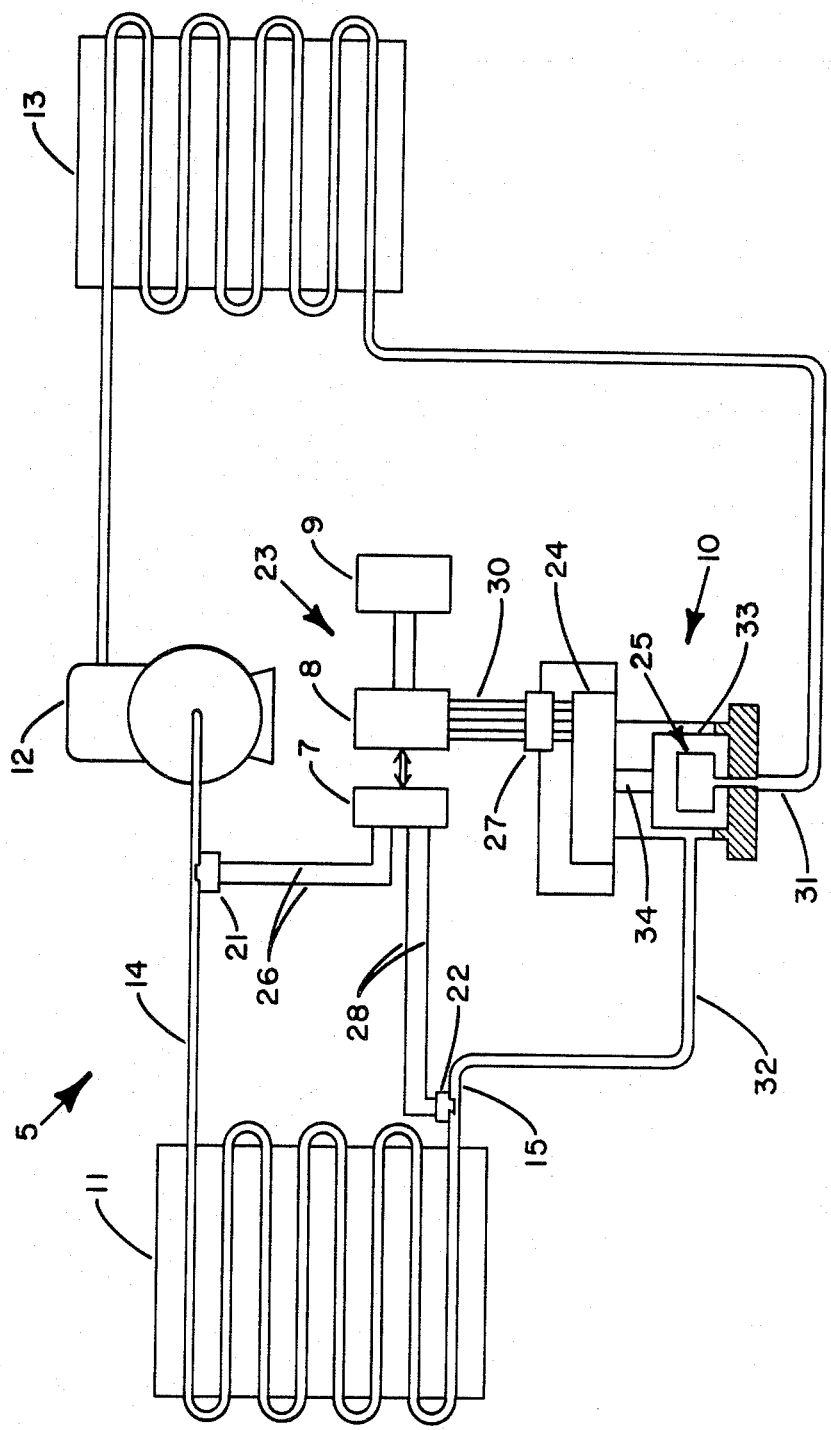
FIG. 1 is a schematic illustration of a vapor compression refrigeration system with an incrementally adjustable electronic expansion valve according to the present invention.

FIG. 1 is a schematic illustration of a vapor compression refrigeration system with an incrementally adjustable electronic expansion valve according to the present invention. Besides the incrementally adjustable electronic expansion valve 10, the vapor compression refrigeration system 5 includes an evaporator 11, a compressor 12, and a condenser 13 connected in the usual manner. The control system for the expansion valve 10 comprises temperature sensors 21 and 22, and a microcomputer control system 23 which includes a microcomputer 7, an electronic switching device 8, and a power supply 9. The electronic expansion valve 10 comprises a stepper motor 24, an orifice assembly 25, an electrical connector 27, and a sleeve member 33. A lead screw 34 connects the stepper motor 24 to the sleeve member 33.

Many types of sensors may be employed as temperature sensors 21 and 22. Preferably, the sensors 21, 22 are temperature responsive resistance devices such as thermistors. As shown in FIG. 1, temperature sensor 21 is connected to refrigerant line 14 to sense the temperature of refrigerant flowing through this line 14 from the evaporator 11 to the compressor 12. This sensed temperature is indicative of the temperature of the superheated refrigerant vapor flowing to the compressor 12. An electrical signal which is a function of the temperature sensed by the temperature sensor 21 is provided to the microcomputer control system 23 through electrical lines 26. Temperature sensor 22 is connected to refrigerant line 15 to sense the temperature of refrigerant entering the evaporator 11 from the expansion valve 10. This temperature is the saturation temperature of refrigerant in the evaporator 11. An electrical signal which is a function of the temperature sensed by the temperature sensor 22 is provided to the microcomputer control system 23 through electrical lines 28.

As shown in FIG. 1, temperature sensors 21, 22 each have sensing elements inserted in the refrigerant lines 14, 15 which are directly in contact with the refrigerant flowing through the refrigerant lines 14, 15. However, it should be noted that the temperature sensors 21, 22 may be simply attached to the refrigerant lines 14, 15 or other types of sensors may be used to sense the desired refrigeration system 5 operating conditions, as will be readily apparent to one of ordinary skill in the art to which the present invention pertains.

The microcomputer control system 23 is a combination of electronic devices suitable for receiving electrical input signals from the temperature sensors 21, 22, for processing the received electrical input signals according to preprogrammed procedures, for generating electronic digital control signals in response to the processed input signals, and for supplying these generated electronic digital control signals through the electrical connector 27 to the stepper motor 24 of the electronic expansion valve 10. For example, as shown in FIG. 1, the microcomputer control system 23 includes the microcomputer 7 for receiving electrical input signals via electrical lines 26, 28 from the temperature sensors 21, 22, and for processing these received electrical input signals according to preprogrammed procedures. The power supply 9 supplies electrical power through the electronic switching device 8 to electrical lines 30 which are connected through the electrical connector 27 to the stepper motor 24 of the electronic expansion valve 10. The electronic switching device 8 is operated under control of the microcomputer 7 to supply electrical power to the stepper motor 24 in the form of electronic digital control signals which are a function of the input signals from the temperature sensors 21, 22, which are received and processed by the microcomputer 7. Normally, electronic devices such as the switching device 8 and the power supply 9 are necessary because microcomputers are not usually well suited for supplying relatively large amounts of electrical power directly to a device such as the stepper motor 24. For example, the microcomputer 7 may be a model 8031 microprocessor with a model 2764 memory device (EPROM), from Intel Corporation of 3065 Bowers Avenue, Santa Clara, Calif. 95051. With this kind of microcomputer it is preferable to supply electrical power to a stepper motor from a power supply through a switching device under the control of the microcomputer rather than attempting to supply the electrical power to the stepper motor directly from the microcomputer.

The microcomputer 7 may be preprogrammed to process the electrical input signals from the temperature sensors 21, 22 according to any one of a variety of procedures. For example, the microcomputer 7 may process the electrical input signals to determine the superheat of the refrigerant vapor flowing from the evaporator 11 to the compressor 12. This is accomplished by the microcomputer 7 calculating the difference in temperature sensed by the temperature sensors 21 and 22. Then the electronic expansion valve 10 may be adjusted by the microcomputer control system 23 to directly respond to this calculated temperature difference. That is, the expansion valve 10 may be incrementally opened or closed by an amount proportional to the calculated temperature difference. In this manner, the superheat of the refrigerant vapor entering the compressor 12 may be maintained at an optimal level which, in turn, optimizes the refrigerant wetting characteristics in the evaporator 11 thereby optimizing overall operating efficiency of the refrigeration system 5. Of course, the microcomputer 7 may monitor other operating conditions of the refrigeration system 5, besides the temperatures sensed by the temperature sensors 21, 22, and the electronic expansion valve 10 may be adjusted by the microcomputer control system 23 in response to appropriate functions of any or all of these sensed operating conditions.

As shown in FIG. 1, the microcomputer control system 23 supplies the electronic digital control signals through the electrical lines 30, and through the electrical connector 27, to the stepper motor 24 which is actuated in a stepwise manner by these control signals. For example, the stepper motor 24 may rotate a certain fixed amount in response to a specific series of electronic digital control signals from the microcomputer control system 23. This stepwise actuation of the stepper motor 24 results in precise control of opening and closing movements of the sleeve member 33 whose position is incrementally controlled relative to the orifice assembly 25 by the stepper motor 24. Preferably, a one step rotation of the stepper motor 24 in response to one pattern of electronic digital control signals from the microcomputer control system 23 is translated by the lead screw 34 into a linear one step increment of opening or closing of the sleeve member 33 relative to the orifice assembly 25 in the electronic expansion valve 10.

It should be noted that the stepper motor 24 may be any type of digitally controllable motor means responsive to the electronic digital control signals from the microcomputer control system 23. For example, the stepper motor 24 may be a model LA23GCK-46 bipolar stepper motor available from Eastern Air Devices of Dover, N.H. This particular stepper motor 24 requires five electrical lines for connecting the electronic switching device 8 of the microcomputer control system 23 to the stepper motor 24. Four of the electrical lines 30 supply the electronic digital control signals to selected poles of the stepper motor 24 to stepwise actuate the stepper motor 24. The fifth electrical line 30 is a common or 12 volt power line.

Figure 3:
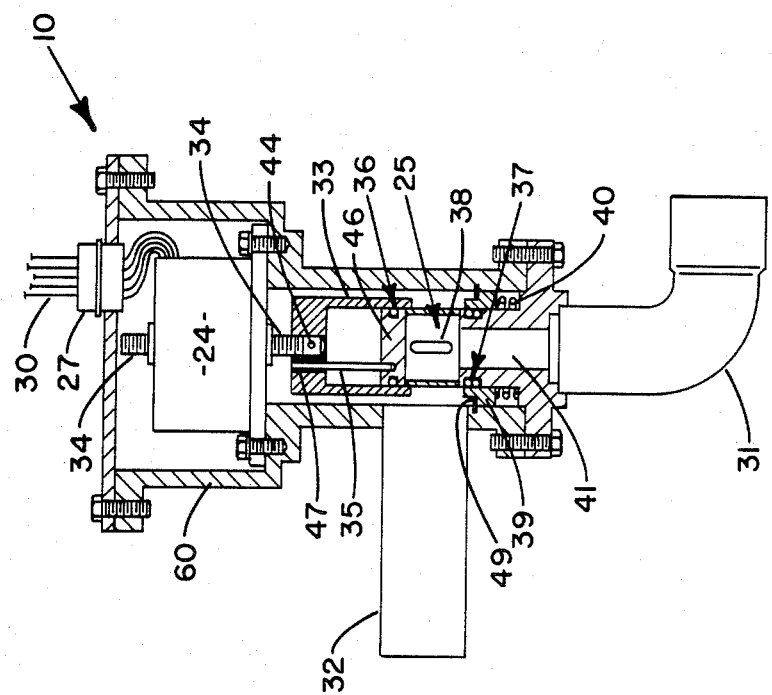
FIG. 3 is a cross-sectional, detailed view of the electronic expansion valve illustrated in FIG. 1 with the valve shown in its fully open position.
Figure 2:
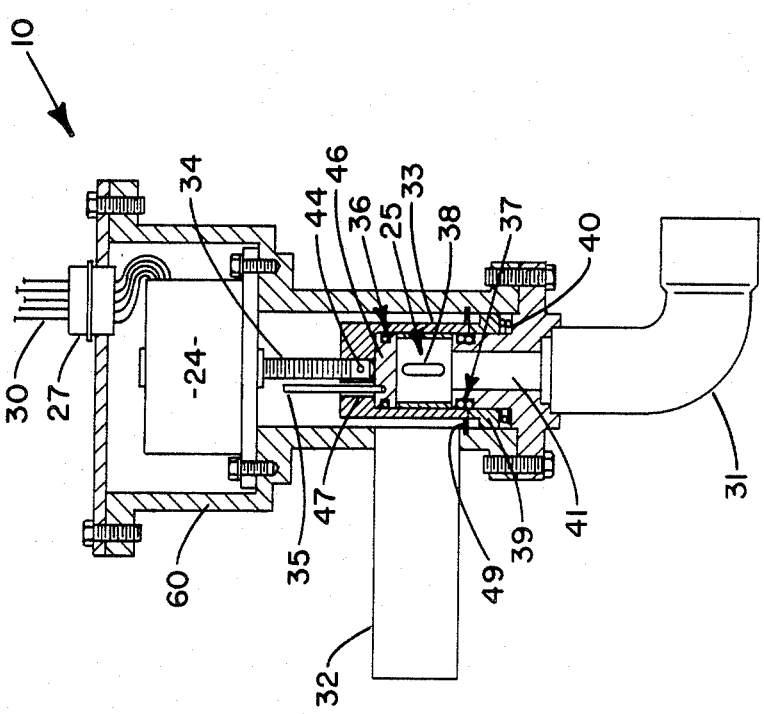
FIG. 2 is a cross-sectional, detailed view of the electronic expansion valve illustrated in FIG. 1 with the valve shown in its fully closed position.

FIGS. 2 and 3 show a cross-sectional view of the novel electronic expansion valve 10 according to the present invention which is preferred for use with the control system depicted in FIG. 1. As shown in FIGS. 2 and 3, the electronic expansion valve 10 is a hermetic, generally cylindrical structure with a generally annular sleeve member 33 which can be incrementally moved up and down over a hollow cylindrical orifice assembly 25 by operation of a rotatable stepper motor 24. The stepper motor 24 is hermetically sealed within housing 60 of the electronic expansion valve 10 to allow refrigerant passing through the valve 10 to flow over the stepper motor 24. FIG. 2 shows the expansion valve 10 in a fully closed position while FIG. 3 shows the expansion valve 10 in a fully open position.

As shown in FIGS. 2 and 3, in addition to the stepper motor 24, the orifice assembly 25, and the sleeve member 33, the electronic expansion valve 10 includes a refrigerant inlet 31, a refrigerant outlet 32, a lead screw 34 connecting the stepper motor 24 and the sleeve member 33, and a rod 35 embedded in a capped end 46 of the orifice assembly 25 and extending up through an opening 47 in the sleeve member 33. Also, there is a first annular sealing means 36 located above a slot 38 in the orifice assembly 25 near the top of the orifice assembly 25 and a second annular sealing means 37 located below the slot 38 in the orifice assembly 25 near an open end 41 of the orifice assembly 25 which is connected to the refrigerant inlet 31. The slot 38 is an elongated opening in the periphery of the orifice assembly 25. The size of the opening of the slot 38 controls the refrigerant flow through the electronic expansion valve 10. For ease of illustration, only one slot 38 is shown in FIGS. 2 and 3. However, it should be noted that there may be a plurality of circumferentially spaced slots 38 in the orifice assembly 25.

Referring to FIG. 3, in operation, liquid refrigerant from the condenser 13 passes through the refrigerant inlet 31 and through the open end 41 of the orifice assembly 25 into the orifice assembly 25. This liquid refrigerant then passes through the slot 38 of the orifice assembly 25 and a portion of the liquid refrigerant passing through the slot 38 is flashed in an adiabatic expansion process as it passes through the slot 38. Then, this mixed liquid and gaseous refrigerant flows out of the valve 10 through the refrigerant outlet 32 to the evaporator 11.

Figure 4:
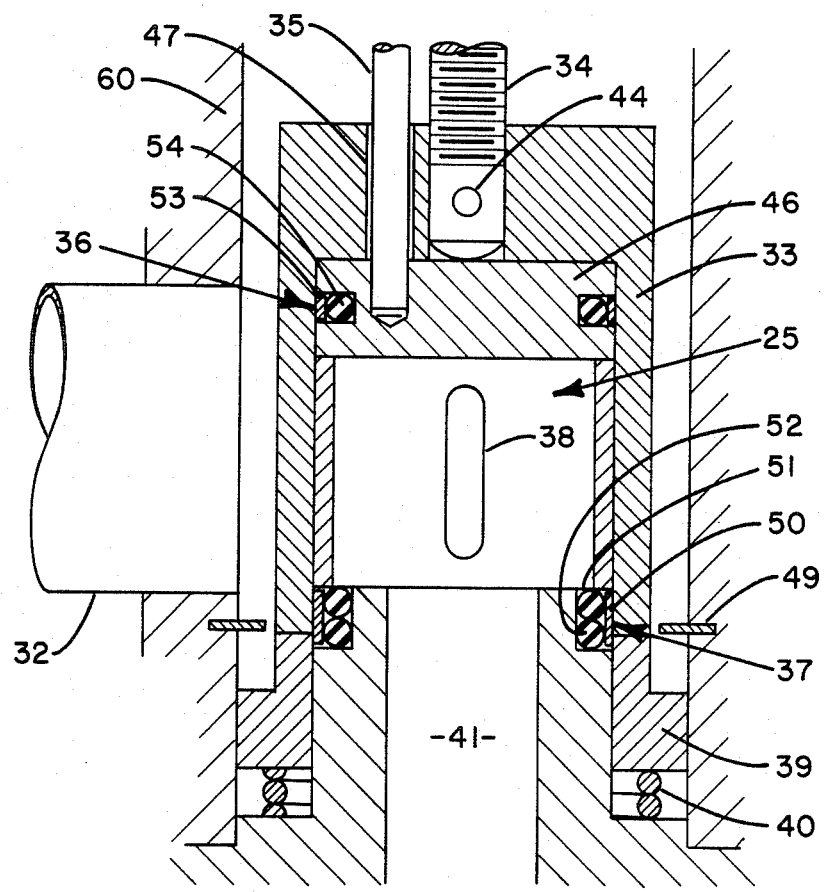
FIG. 4 is a cross-sectional, detailed view of the sealing means in the orifice assembly which is part of the novel electronic expansion valve shown in FIGS. 2 and 3.

The sleeve member 33 slides up and down over the orifice assembly 25 to adjust the size of the opening of the slot 38 in the orifice assembly 25. This linear sliding movement of the sleeve member 33 is controlled by operation of the stepper motor 24 which transmits forces to the sleeve member 33 through the lead screw 34 which is attached to the sleeve member 33 by a pin 44 as shown in FIGS. 2, 3, and 4. In this manner, the size of the opening of the slot 38 in the orifice assembly 25 is precisely controlled because the sleeve member 33 is moved only in increments by stepwise actuation of the stepper motor 24.

In a preferred mode of operation, the electronic digital control signals received by the stepper motor 24 through the electrical lines 30 operate the stepper motor 24 to rotate the stepper motor 24 in discrete steps as discussed above. This discrete rotation of the stepper motor 24 results in incrementally adjusting the position of the sleeve member 33 relative to the slot 38 in the orifice assembly 25. Ideally, each electronic digital control signal which is supplied via the electrical lines 30 to the stepper motor 24 should ultimately increment the sleeve member 33 a single discrete unit of movement either up or down over the slot 38 in the orifice assembly 25 depending on the direction of rotation of the stepper motor 24. Preferably, the sleeve member 33 has a relatively long stroke and the slot 38 in the orifice assembly 25 is relatively long compared to orifices in conventional refrigerant expansion valves. For example, the length of the slot 38 in the orifice assembly 25 may be on the order of ¾ of an inch (19.05 millimeters) with the sleeve member 33 having incremental steps of movement on the order of 0.001 inch (0.0254 millimeters) per step thereby providing approximately 760 discrete opening sizes for the slot 38. This results in extremely precise control of the size of the opening of the slot 38 and consequently very precise control of the refrigerant flow through the electronic expansion valve 10.

It should be noted that the rod 35 is embedded in the capped end 46 of the orifice assembly 25 and passes up through the opening 47 in the sleeve member 33. The rod 35 does not completely fill the opening 47 in the sleeve member 33 thereby allowing refrigerant to flow through the opening 47 to equalize pressures on opposing surfaces of the sleeve member 33 during operation of the electronic expansion valve 10. The rod 35 also prevents undesirable rotations of the sleeve member 33 relative to the orifice assembly 25 by torques which are transmitted from the stepper motor 24 through the lead screw 34 to the sleeve member 33 during operation of the stepper motor 24.

Because the sleeve member 33 is moved only in increments relative to the slot 38 in the orifice assembly 25, the absolute position of the sleeve member 33 relative to the orifice assembly 25, and, therefore, the size of the opening of the slot 38, can be monitored by the microcomputer control system 23 to a high degree of accuracy during operation of the electronic expansion valve 10. However, at startup of the refrigeration system 5 the absolute position of the sleeve member 33 relative to the orifice assembly 25 must be determined to initialize the microcomputer control system 23. This is accomplished by the microcomputer control system 23 supplying electronic digital control signals via electrical lines 30 to the stepper motor 24 to drive the sleeve member 33 to a fully closed position at startup of the refrigeration system 5. If the sleeve member 33 is already fully closed at startup then the stepper motor 24 will simply slip as the microcomputer control system 23 drives the sleeve member 33 closed without harming the stepper motor 24 or the sleeve member 33.

After initializing the starting position of the electronic expansion valve 10, the microcomputer control system 23 controls the electronic expansion valve 10 in response to operating conditions of the refrigeration system 5 starting from the known fully closed position of the valve 10. During operation of the refrigeration system 5, the logic circuitry of the microcomputer control system 23 retains the last known position of the sleeve member 33 in memory and when the position of the sleeve member 33 is adjusted the microcomputer control system 23 changes the memory to reflect the new position of the sleeve member 33. In this manner, the position of the sleeve member 33 and thus the size of the opening of the slot 38 in the orifice assembly 25 are continuously known during operation of the refrigeration system 5 without the necessity of providing any type of absolute position sensing means, such as a feedback sensor, for sensing the position of the sleeve member 33.

Referring to FIG. 2, when the electronic expansion valve 10 is in the fully closed position; that is, when the sleeve member 33 completely covers the slot 38 in the orifice assembly 25, first and second annular sealing means 36, 37, substantially prevent refrigerant flow between the refrigerant inlet 31 and the refrigerant outlet 32 of the valve 10. As best shown in FIG. 4, preferably, the first sealing means 36 comprises a carbon filled teflon seal 53 backed by an O-ring 54 while the second sealing means 37 comprises another carbon filled teflon seal 50 backed by two O-rings 51 and 52. Each sealing means 36, 37 is seated in an annular recess in the main body of the orifice assembly 25. The first sealing means 36 is located in the capped end 46 of the orifice assembly 25 above the slot 38 in the orifice assembly 25. The second sealing means 37 is located at the open end 41 of the orifice assembly 25 in the main body of the orifice assembly 25 below the slot 38. When the sleeve member 33 is in the fully closed position, the sealing means 36, 37 are located between the main body of the orifice assembly 25 and the sleeve member 33. Thus, the sealing means 36, 37 and the sleeve member 33 surround the slot 38 to effectively prevent refrigerant flow through the electronic expansion valve 10 when the sleeve member 33 is in its fully closed position. Also, it should be noted that the sealing means 36, 37 are designed so that there are no unbalanced forces on the fully closed sleeve member 33 which must be overcome when it is desired to move the sleeve member 33 from its fully closed position.

An annular spring loaded follower 39 is provided near the bottom of the orifice assembly 25 as shown in FIGS. 2, 3, and 4. The spring loaded follower 39 is upwardly biased by a spring 40 to cover the second annular sealing means 37 when the sleeve member 33 moves upward out of contact with the second sealing means 37 and out of contact with the follower 39. The spring loaded follower 39 covers the second annular sealing means 37 to compress the sealing means 37 into its annular recess thereby preventing the sealing means 37 from unseating out of its annular recess due to the normal pressure variations across the electronic expansion valve 10 during operation of the valve 10. As best shown in FIG. 4, the spring 40 allows the sleeve member 33 to displace the spring loaded follower 39 downwardly, partially out of contact with the second sealing means 37 when the sleeve member 33 is moved to its fully closed position. Also, a stop 49 is provided as shown in FIGS. 2, 3 and 4, to provide a stop surface for limiting the upward travel distance of the spring loaded follower 39 when the sleeve member 33 is moved out of contact with the follower 39.

The first and second sealing means 36, 37 provide positive, complete shutoff of refrigerant flow through the electronic expansion valve 10 when the sleeve member 33 is in its fully closed position. Thus, if desired, the electronic expansion valve 10 may be operated by the microcomputer control system 23 to provide a shutoff valve function thereby eliminating the need for a conventional liquid line solenoid valve in the refrigerant line connecting the condenser 13 to the electronic expansion valve 10 of the refrigeration system 5. Such a conventional liquid line solenoid valve is normally required to prevent refrigerant migration from the condenser 13 to the evaporator 11 during periods of shutdown of the refrigeration system 5. Eliminating the need for such a conventional liquid line solenoid valve greatly simplifies the structure, operation, and cost of the refrigeration system 5. Of course, an input indicating shutdown of the refrigeration system 5 must be provided to the microcomputer control system 23 and the system 23 must be programmed to drive the sleeve member 33 to its fully closed position when the input indicating shutdown of the refrigeration system 5 is provided to the microcomputer control system 23.

Of course, the foregoing description is directed to a preferred embodiment of the present invention and various modifications and other embodiments of the present invention will be readily apparent to one of ordinary skill in the art to which the present invention pertains. Therefore, while the present invention has been described in conjunction with a particular embodiment it is to be understood that various modifications and other embodiments of the present invention may be made without departing from the scope of the invention as described herein and as claimed in the appended claims.

What is claimed is:

1. A refrigeration system including a compressor, a condenser, and an evaporator, and including an electronic refrigerant expansion valve comprising:

an inlet means for receiving refrigerant from the condenser;

an outlet means for discharging refrigerant to the evaporator;

an orifice means, connected between the inlet means and the outlet means, said orifice means including a generally cylindrical orifice assembly having a top end which is capped, a bottom end which is open and connected to receive refrigerant from the inlet means, and at least one orifice opening, located between the capped end and the open end of said assembly, for controlling refrigerant flow between the inlet means and the outlet means;

a sleeve member which slides over the orifice means to adjust the size of the orifice opening depending on the position of the sleeve member relative to the orifice means;

a first annular sealing means, located in an annular recess in the orifice assembly above the orifice opening and positioned between the sleeve member and the orifice assembly, for substantially preventing refrigerant flow across said first annular sealing means when the sleeve member is in a fully closed position covering over the orifice opening in the orifice assembly;

a second annular sealing means, located in another annular recess in the orifice assembly below the orifice opening and positioned between the sleeve member and the orifice assembly when the sleeve member is in its fully closed position, for substantially preventing refrigerant flow across said second annular sealing means when the sleeve member is in its fully closed position;

a spring biased follower means, positioned to follow movements of the sleeve member, for covering over the second annular sealing means to hold the second annular sealing means in its annular recess when the sleeve member moves out of contact with the second annular sealing means and for partially uncovering the second annular sealing means when the sleeve member moves into contact with the second annular sealing means; and motor means, operatively connected to the sleeve member, for incrementally adjusting the position of the sleeve member relative to the orifice means in response to electronic digital control signals received by said motor means.

2. A refrigeration system including an electronic refrigerant expansion valve as recited in claim 1 further comprising:

means for housing the orifice means, the sleeve member, and the motor means to form a hermetic unit.

3. A refrigeration system including an electronic refrigerant expansion valve as recited in claim 1 wherein:

the motor means comprises a stepper motor which generates stepwise rotational motion in response to electronic digital control signals received by said stepper motor; and wherein the electronic expansion valve further comprises a lead screw, connected between the stepper motor and the sleeve member, to incrementally adjust the linear position of the sleeve member in response to rotational motions of the stepper motor; and a rod imbedded in the orifice means and connected to the sleeve member to prevent rotation of the sleeve member relative to the orifice means by torques transmitted from the stepper motor through the lead screw to the sleeve member.

4. A refrigeration system including an electronic refrigerant expansion valve as recited in claim 1 further comprising sealing means, located between the orifice means and the sleeve member, for substantially preventing refrigerant flow through the electronic expansion valve when the sleeve member is in a fully closed position completely covering over the orifice opening in the orifice means.

5. A refrigeration system including an electronic refrigerant expansion valve as recited in claim 1 wherein each of the first and second annular sealing means comprises a seal backed by at least one O-ring.

6. A refrigeration system including an electronic refrigerant expansion valve as recited in claim 1 further comprising a stop member positioned to provide a stop surface against which the spring biased follower means abuts to limit upward movement of the spring biased follower means when the spring biased follower means covers over the second annular sealing means.

* * * * *